United States Patent
McClellan

[15] 3,685,197
[45] Aug. 22, 1972

[54] SIMULATED PORK RIND FISHING LURE

[72] Inventor: Bingham A. McClellan, Traverse City, Mich.

[73] Assignee: McClellan Industries, Inc., Traverse City, Mich.

[22] Filed: Aug. 17, 1970

[21] Appl. No.: 64,526

[52] U.S. Cl. ................43/42.24, 43/42.34, 161/95
[51] Int. Cl. ............................................A01k 85/00
[58] Field of Search....43/42.24, 42.34, 42.53, 42.29; 161/89, 95

[56] References Cited

UNITED STATES PATENTS

| | | |
|---|---|---|
| 3,263,613 | 8/1966 | Rice et al.................161/95 X |
| 2,480,580 | 8/1949 | Hopkins................43/42.34 X |
| 2,629,678 | 2/1953 | Thompson et al...........161/95 |
| 3,122,853 | 3/1964 | Koonz et al...............43/42.24 |
| 2,281,635 | 5/1942 | Strauss........................161/89 |

Primary Examiner—Samuel Koren
Assistant Examiner—Daniel J. Leach
Attorney—Austin A. Webb

[57] ABSTRACT

A sheet of synthetic flexible plastic material is molded over a sheet of plastic strands woven into an open mesh, with the plastic pressed into and through the openings of the mesh so that the mesh is embedded in the sheet.

2 Claims, 6 Drawing Figures

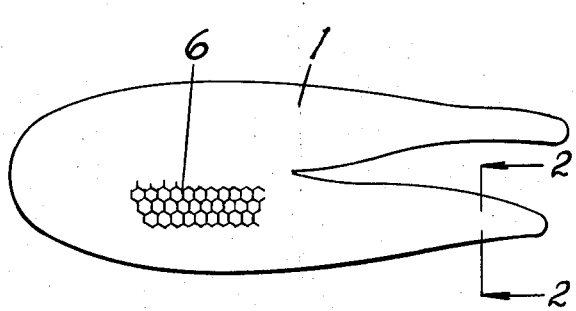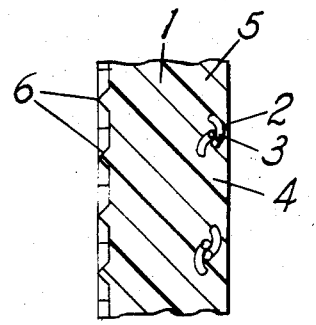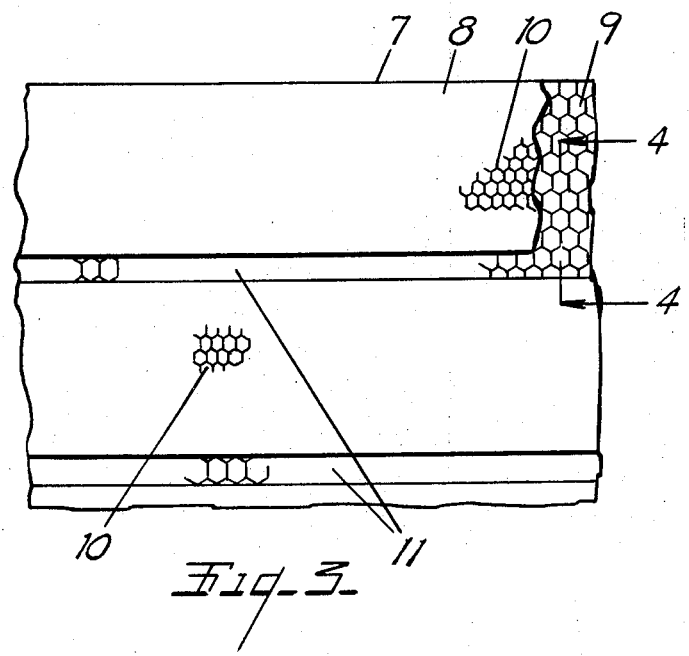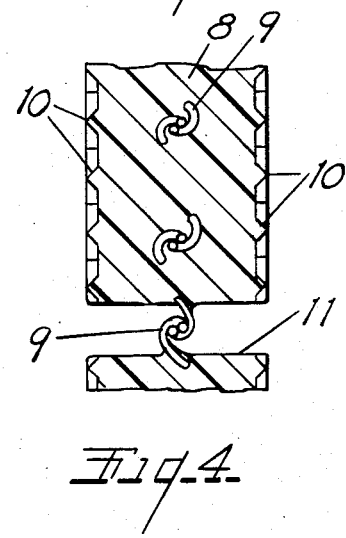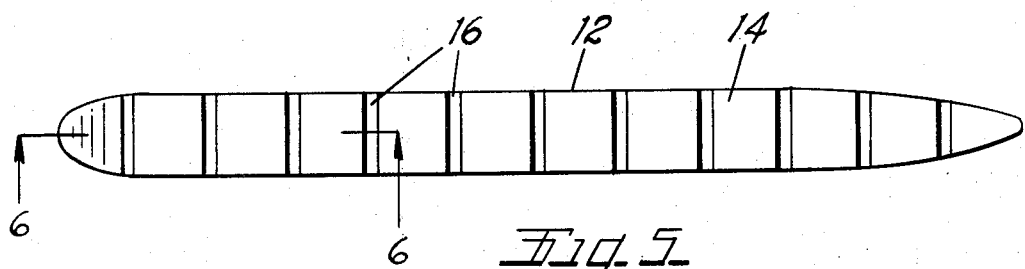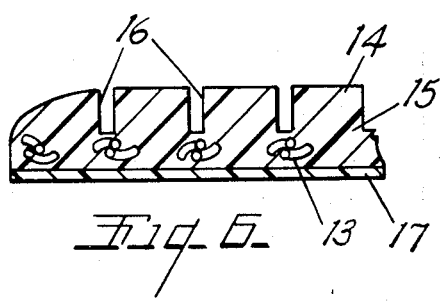
INVENTOR.
BINGHAM A. McCLELLAN
ATTORNEY.

SIMULATED PORK RIND FISHING LURE

One form of the lure is thin and roughly two to five times the thickness of the mesh, with mesh in the center of the sheet and with the pattern of the mesh reproduced on both surfaces of the plastic. The sheet is molded with sectional divider lines formed as grooves which extend to the mesh from both sides.

Another form molds the mesh essentially on the surface of the sheet.

Still another form molds a relatively thick body on one side of a long and narrow strip of mesh with transverse grooves molded in the plastic body to form generally rectangular sections flexibly connected to the mesh.

DESCRIPTION

The drawings, of which there is one sheet, illustrate preferred embodiments of the three forms of the lure.

FIG. 1 is a plan view of a first form of the lure cut to resemble a piece of pork rind.

FIG. 2 is an enlarged cross sectional view taken along the plane of the line 2—2 in FIG. 1.

FIG. 3 is a plan view of a sheet of material for forming a second form of the lure, with parts of the surface of the sheet broken away.

FIG. 4 is an enlarged cross sectional view taken along the line 4—4 in FIG. 3.

FIG. 5 is a top plan view of a third form of the lure.

FIG. 6 is an enlarged cross sectional view taken along the plane of the line 6—6 in FIG. 5.

The lure 1 shown in FIGS. 1 and 2 has been cut from a larger sheet of material having the same properties. It is a feature of the invention that fishermen may cut lures to the size and shape desired due to the soft nature of the material. The lure consists of a backing sheet 2 of plastic strands 3. The strands are woven or knitted into a loose mesh having generally regularly arranged openings 4.

The body of the lure 1 is a layer of soft synthetic plastic material 5 which is flowed or molded on top of the mesh 3 to enter into the openings 4 and embed the mesh in the bottom surface of the plastic. The plastic is two to five times the thickness of the mesh. A scale-like pattern is produced on the top surface of the plastic by fine or narrow ridges 6 on the surface.

FIGS. 3 and 4 show a sheet of material 7 from which modified forms of a lure similar to that shown in FIGS. 1 and 2 may be cut. The sheet 7 consists of a thin body 8 of flexible synthetic plastic material, poured or molded on both sides of a sheet of plastic mesh 9. The sheet 7 is two to five times the thickness of the mesh, and the mesh lies at about the middle of the sheet. The scale-like pattern is produced on both sides of the sheet by narrow ridges 10.

The sheet material shown in FIGS. 3 and 4 is divided into strips by molding parallel grooves 11 into both sides of the body 8 down to approximately the surface of the mesh 9. The sections of the sheet may be easily divided by cutting along the grooves, and the separated sections may be used as lures as cut, or they may be further cut in different shapes and smaller sizes as desired.

The lure 12 shown in FIGS. 5 and 6 consists of a long, narrow, strip 13 of plastic mesh similar to the mesh in the other forms of the lures. A relatively thick but long and narrow body 14 is formed on the mesh by synthetic plastic material 15 which is molded in sections on the mesh, with molded grooves 16 separating the sections. The body is eight or ten times the thickness of the mesh, and the thickness of the body sections may be varied along the length of the body by molding the body in an open top mold and pressing the mesh into the surface of the body sections. A seal or cover layer 17 is flowed onto the top of the mesh and solidified with the body.

All forms of the lure and lure material remain soft and limber; and the woven mesh strengthens the plastic body, and also permits the lure to be impaled on a hook at any point in the body. The synthetic plastic bodies are preferably formed of plasticized polyvinylchloride cured to a hardness of between 5 and 15 on the Shore A scale. The plastic may be translucent or opaque, and may be colored as desired.

What is claimed as new is:

1. An artificial fishing lure comprising,
   a reinforcing sheet of plastic threads formed into an open mesh,
   and a body layer of synthetic flexible plastic molded on said sheet and extending into the openings of said mesh in adhering relation around the threads thereof,
   said body layer being arranged in spaced sections with said reinforcing mesh exposed between the sections.

2. A lure as defined in claim 1 in which said body layer sections are of equal width and separated by straight and narrow grooves about as wide as an opening in the mesh in the reinforcing layer.

* * * * *